US012685409B2

(12) United States Patent
Oh et al.

(10) Patent No.: US 12,685,409 B2
(45) Date of Patent: Jul. 21, 2026

(54) METHOD AND APPARATUS FOR AUTOMATICALLY COOKING USER-CUSTOMIZED FOOD

(71) Applicant: RONIK CO., LTD., Seoul (KR)

(72) Inventors: Jin Hwan Oh, Seoul (KR); Sung Hyuk Song, Daegu (KR); Da Ye Jeong, Seoul (KR); Jae Woo Jeong, Incheon (KR)

(73) Assignee: RONIK CO., LTD., Seoul (KR)

( * ) Notice: Subject to any disclaimer, the term of this patent is extended or adjusted under 35 U.S.C. 154(b) by 0 days.

(21) Appl. No.: 19/128,428

(22) PCT Filed: Dec. 1, 2023

(86) PCT No.: PCT/KR2023/019713
§ 371 (c)(1),
(2) Date: May 8, 2025

(87) PCT Pub. No.: WO2024/123002
PCT Pub. Date: Jun. 13, 2024

(65) Prior Publication Data
US 2026/0007279 A1 Jan. 8, 2026

(30) Foreign Application Priority Data

Dec. 7, 2022 (KR) ........................ 10-2022-0169588
Jul. 31, 2023 (KR) ........................ 10-2023-0099458
Nov. 10, 2023 (KR) ........................ 10-2023-0155585

(51) Int. Cl.
*A47J 47/01* (2006.01)
*B25J 11/00* (2006.01)
*B65G 15/24* (2006.01)

(52) U.S. Cl.
CPC ........... *A47J 47/01* (2013.01); *B25J 11/0045* (2013.01); *B65G 15/24* (2013.01)

(58) Field of Classification Search
CPC ........ A47J 47/01; B25J 11/0045; B25J 11/00; B25J 13/00; B65G 15/24; B65G 33/02; F25D 17/04; G06Q 50/12
See application file for complete search history.

(56) References Cited

U.S. PATENT DOCUMENTS

2017/0290345 A1 10/2017 Garden et al.
2020/0139554 A1* 5/2020 Sinnet ...................... B25J 19/02
2023/0389754 A1* 12/2023 Lerner ................... A47J 44/00

FOREIGN PATENT DOCUMENTS

KR 20-0374842 Y1 2/2005
KR 10-1716641 B1 3/2017
(Continued)

*Primary Examiner* — Paul R Durand
(74) *Attorney, Agent, or Firm* — Bridgeway IP Law Group, PLLC; Jihun Kim

(57) ABSTRACT

Embodiments relate to a method of providing a cooking automation service that cooks a finished product without a user performing a separate cooking action, and an apparatus therefor. The method may include (a) a first step of generating order information corresponding to order details input by a user; (b) a second step of transmitting a first control command to a first module among the N modules according to the generated order information; (c) a third step of respectively transmitting a second control command to an (N−1)th control command to one or more of a second module to an (N−1)th module among the N modules; and (d) a fourth step of transmitting an N-th control command to an N-th module among the N modules.

5 Claims, 11 Drawing Sheets

10

(56)          References Cited

FOREIGN PATENT DOCUMENTS

| | | | |
|---|---|---|---|
| KR | 10-2019-0054556 | A | 5/2019 |
| KR | 10-2060518 | B1 | 12/2019 |
| KR | 10-2266392 | B1 | 6/2021 |
| KR | 10-2386408 | B1 | 4/2022 |
| KR | 10-2394743 | B1 | 5/2022 |
| KR | 10-2464323 | B1 | 11/2022 |

* cited by examiner

Detect weight 50g + α and then move

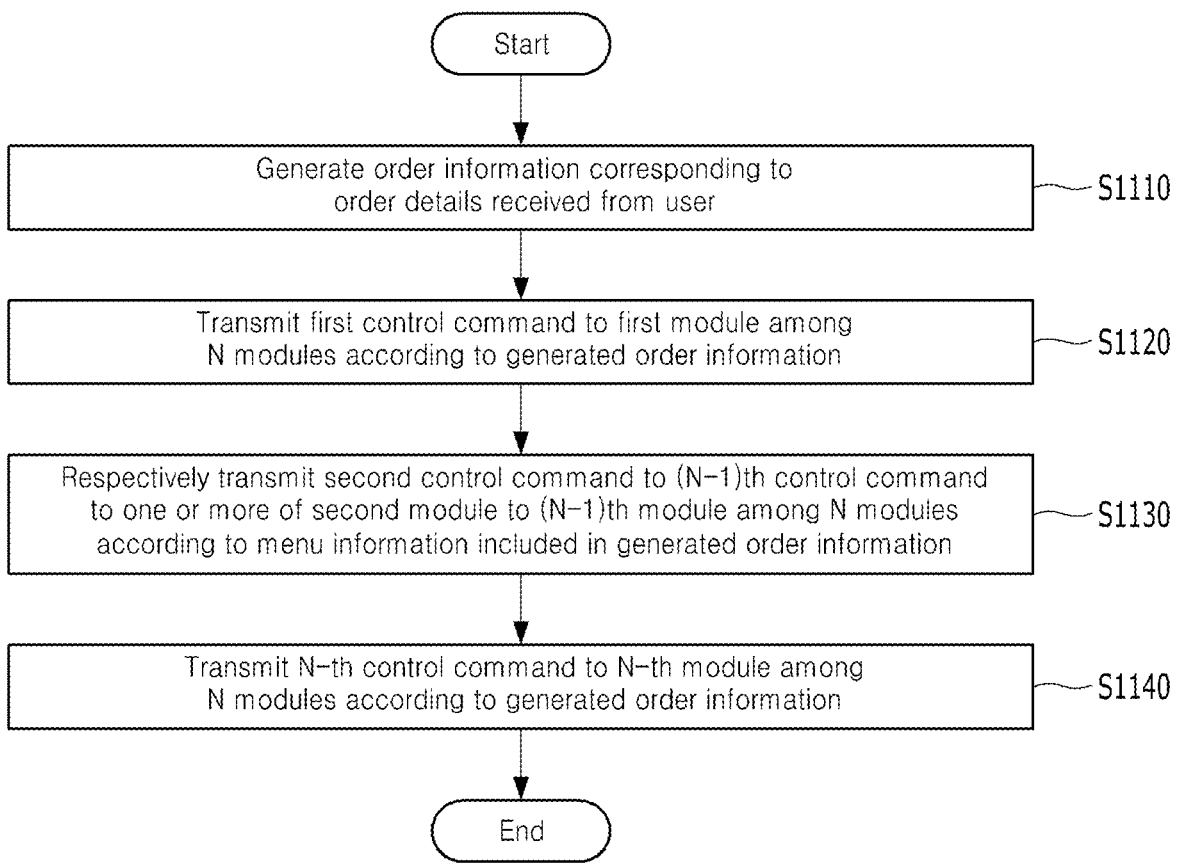

Start

Generate order information corresponding to
order details received from user ——— S1110

Transmit first control command to first module among
N modules according to generated order information ——— S1120

Respectively transmit second control command to (N−1)th control command
to one or more of second module to (N−1)th module among N modules
according to menu information included in generated order information ——— S1130

Transmit N-th control command to N-th module among
N modules according to generated order information ——— S1140

End

FIG. 11

METHOD AND APPARATUS FOR AUTOMATICALLY COOKING USER-CUSTOMIZED FOOD

TECHNICAL FIELD

The present disclosure relates to a method and apparatus for automatically cooking user-customized food. More specifically, the present disclosure relates to a method of providing a cooking automation service that cooks a finished product without a user performing a separate cooking action, and an apparatus therefor.

BACKGROUND ART

A general restaurant owner directly cooks a menu ordered by a customer or through a professional cook such as a chef, and as a result, there are frequent cases where the taste varies when a person in charge of preparing the menu changes.

Meanwhile, in a recent restaurant industry, the shortage of all personnel, including professional cooks in charge of cooking, has emerged as a serious problem, and even if they are hired with difficulty, labor costs have risen significantly compared to the past, so there are frequent cases where actual profits are almost non-existent after deducting labor costs from total sales, and there are also many cases where employees suddenly do not show up for work or quit without any notice, which increases the worries of restaurant owners day by day, and in the worst case, some restaurant owners go out of business, which has become a social problem.

Recently, some automated robots loaded with artificial intelligence have been introduced to help restaurant owners operate their businesses, but they are not for cooking, but for serving within the hall, and the reality is that the field of cooking still relies on human hands.

Nevertheless, it is also true that the introduction of automated robots has solved the problem of serving in halls and is spreading at a rapid pace, and many restaurant owners are rushing to introduce them, so there is a need to try introducing automated robots in the field of cooking as well. The present disclosure is relevant in this regard.

DISCLOSURE OF INVENTION

Technical Problem

A technical problem to be solved by the present disclosure is to provide a method and apparatus for automatically cooking user-customized food by applying automated robots, which have maintenance costs significantly lower than labor costs and have no possibility of unauthorized absence or resignation, to the field of cooking.

Another technical problem to be solved by the present disclosure is to provide a method and apparatus for automatically cooking user-customized food, which can provide a cooking automation service in which an automated robot that generates order information completely cooks a finished product without including any part of the cooking process by humans.

Technical problems of the present disclosure are not limited to the above-mentioned problems, and other technical problems which are not mentioned herein will be clearly understood by those skilled in the art from the description below.

Technical Solution

In order to achieve the foregoing method for automatically cooking user-customized food by an apparatus including N modules (N is a natural number greater than or equal to 3) may include (a) a first step of generating order information corresponding to order details input by a user, the order information including menu information, which is information generated about a menu that the user wishes to order, (b) a second step of transmitting a first control command to a first module among the N modules according to the generated order information, the first control command being a container discharge command, (c) a third step of respectively transmitting a second control command to an (N−1)th control command to one or more of a second module to an (N−1)th module among the N modules according to the menu information included in the generated order information, and (d) a fourth step of transmitting an N-th control command to an N-th module among the N modules according to the generated order information, the N-th control command being a container lifting command, wherein each of the first control command to the (N−1)th control command includes a conveyor belt control command for driving a conveyor belt included in a module receiving each control command to move the container a predetermined distance toward a neighboring module.

According to one embodiment, each of the second module to the (N−1)th module may include M (M is a natural number greater than or equal to 2) ingredient discharge units that store ingredients and discharge the ingredients into the container, wherein in this case, each of the second control command to the (N−1)th control command includes one or more ingredient discharge commands that drive one or m ore of the M ingredient discharge units included in the module receiving each control command to discharge the ingredient into the container.

According to one embodiment, the ingredient discharge command may be transmitted to one or more ingredient discharge units among the M ingredient discharge units included in each of the second module to the (N−1)th module according to the menu information, and may not be transmitted to the remaining ingredient discharge units.

According to one embodiment, a predetermined distance for moving the container toward a neighboring module according to the conveyor belt control command may be a distance from a current position of the container to a nearest ingredient discharge unit that has received the ingredient discharge command in a direction of the neighboring module.

According to one embodiment, the menu information may be preset recipe information on when the user orders one of preset menus, and may be recipe information on one or more types of ingredients selected by the user himself or herself to cook, when the user orders a customized menu other than the preset menu, the customized menu.

Advantageous Effects

According to the present disclosure as described above, when simply receiving order details from a user, order information including recipe information may be generated, and control commands may be sent only to modules required to cook a menu ordered by the user according to the generated order information so as to automatically cook food, thereby having an advantage in that a restaurant business can be operated without hiring professional cooks with high labor costs.

In addition, even if each module includes a plurality of ingredient discharge units, a control command received by the module may include an ingredient discharge command that is transmitted only to an ingredient discharge unit that requires food discharge so as to prevent a situation in which an unintended ingredient is discharged, thereby having an effect that can effectively cook user-customized food.

In addition, a control command received by each module may include a conveyor belt control command for moving a container, the conveyor belt control command may be responsible for sequentially moving the container for ingredient discharge units that require ingredient discharge, a control command for a module including an ingredient discharge unit that lastly discharges an ingredient may include a conveyor belt control command for automatically moving the container to a last module, and a control command for the last module may include a lifting command for providing the container with completed food to the user, thereby having an effect that a finished product can be fully cooked without including any part of the cooking process by humans.

The effects of the present disclosure are not limited to the above-mentioned effects, and other effects that are not mentioned herein will be clearly understood by those skilled in the art from the description below.

BRIEF DESCRIPTION OF THE DRAWINGS

FIG. 11 is a flowchart showing representative steps of a method for automatically cooking user-customized food according to a second embodiment of the present disclosure.

BEST MODE FOR CARRYING OUT THE INVENTION

Figure 1:
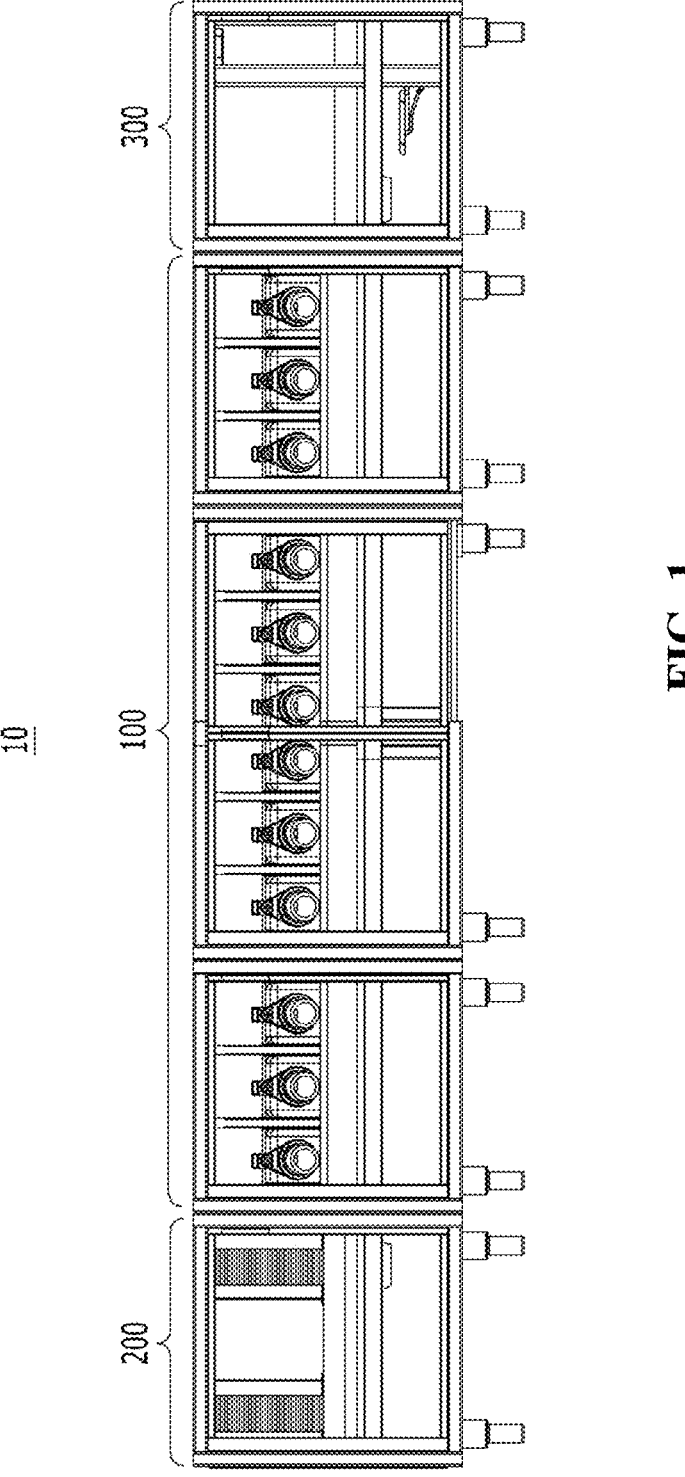
FIG. 1 is a view schematically showing an overall configuration of a modular automated cooking apparatus according to a first embodiment of the present disclosure.

Hereinafter, preferred embodiments of the present disclosure will be described in detail with reference to the accompanying drawings. Advantages and features of the present disclosure, and methods of accomplishing the same will be clearly understood with reference to the following embodiments described in detail in conjunction with the accompanying drawings. However, the present disclosure is not limited to those embodiments disclosed below but may be implemented in various different forms. It should be noted that the present embodiments are merely provided to make a full disclosure of the invention and also to allow those skilled in the art to know the full range of the invention, and therefore, the present disclosure is to be defined only by the scope of the appended claims. Like reference numerals refer to like elements throughout the specification.

Unless otherwise defined, all terms (including technical and scientific terms) used herein may be used with meanings that can be commonly understood by those skilled in the art to which the present disclosure pertains. Additionally, terms defined in commonly used dictionaries are not interpreted ideally or excessively unless clearly specifically defined. It should be noted that the terms used herein are merely used to describe the embodiments, but not to limit the present disclosure. In this specification, unless clearly used otherwise, expressions in a singular form include a plural form.

Terms such as "first" and "second" are used to distinguish one element from another element, and the scope of rights should not be limited by those terms. For example, a first element may be termed as a second element, and likewise, a second element may be termed as a first element.

The term "comprises" and/or "comprising" used in the specification intend to express a constituent element, a step, an operation and/or a device does not exclude the existence or addition of one or more other constituent elements, steps, operations and/or devices.

Meanwhile, the present disclosure is not limited to the foregoing specific embodiments and application examples, it will be of course understood by those skilled in the art that various modifications may be made without departing from the gist of the present disclosure as defined in the following claims, and it is to be noted that those modifications should not be understood individually from the technical concept and prospect of the present disclosure.

FIG. 1 is a view schematically showing an overall configuration of a modular automated cooking apparatus 10 according to a first embodiment of the present disclosure.

The modular automated cooking apparatus 10 according to the first embodiment of the present disclosure relates to an apparatus that performs a cooking automation process of putting, when ingredients are supplied by a user, ingredients necessary for a finished product into a container without a separate cooking action by the user so as to provide the finished product to the user.

The modular automated cooking apparatus 10 according to the first embodiment of the present disclosure may include a cooking module 100, a container supply module 200, and a lifting module 300 to perform a cooking automation process.

The cooking module 100 is a module that can discharge ingredients required for a finished product in a direction in which the container is disposed, or perform a cooking operation (e.g., trimming, slicing, shaking, etc.) as needed.

A number of the cooking modules 100 may vary depending on a size of a cooking facility (e.g., store), a category of a menu, or a user's arbitrary selection, and herein, it may be expressed that the modular automated cooking apparatus 10 includes M (M is a positive integer) cooking modules 100.

The container supply module 200 is a module that supplies containers to the cooking module 100 so as to allow ingredients cooked by the cooking module 100 to be contained in the containers.

The lifting module 300 is a module that lifts a finished product that has been inside the modular automated cooking apparatus 10 to an outside of the modular automated cooking apparatus 10 in order to provide the finished product, that is, a product containing ingredients in a container, to the user.

The cooking module 100, the container supply module 200, and the lifting module 300 described above will be sequentially examined below, and first, the cooking module 100 will be described with reference to FIGS. 2 to 4.

Figure 2:
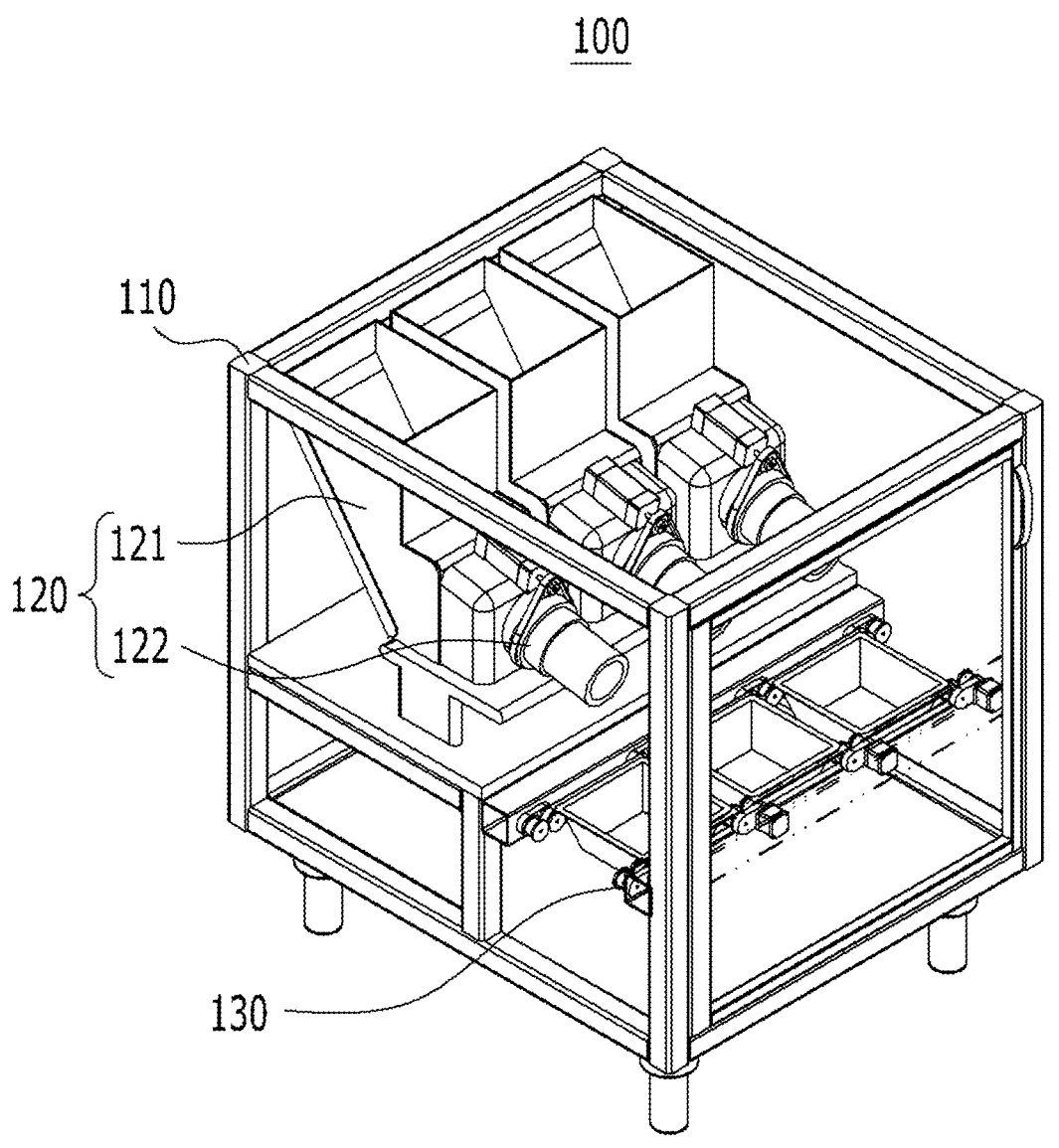
FIG. 2 is a perspective view showing an overall configuration of a cooking module in the modular automated cooking apparatus according to the first embodiment of the present disclosure.

FIG. 2 is a perspective view showing an overall configuration of the cooking module 100 according to the first embodiment of the present disclosure.

Referring to FIG. 2, the cooking module 100 may include a first frame 110, an ingredient discharge unit 120, and an ingredient moving part 130 to perform a cooking function during a cooking automation process.

The first frame 110 may have a predetermined shape to serve as a skeleton and body of the cooking module 100.

The first frame 110 may have a hexahedral (or cube) shape as shown in FIG. 2, but is not limited thereto, and the shape of the first frame 110 may be changed depending on a store space, a user's taste, marketing, and an arrangement of elements included within the cooking module 100, and furthermore, the first frame 110 may be designed so as to allow the user to change the shape to suit the user's taste by assembling or reconfiguring each joint constituting the first frame 110.

The first frame 110 may be designed to be connected or coupled to another first frame 110. In other words, the first frame 110 of a first cooking module 100 and the first frame 110 of another second cooking module 100 may be provided so as to be connected or coupled in such a manner that the first cooking module 100 and the second cooking module 100 can be organically connected to each other.

In addition, the material of the first frame 110 may include a heat insulating material or a heat retaining material such as polyurethane foam, polyisocyanurate, polystyrene foam, or light polystyrene (XPS) to maintain the freshness of ingredients stored inside the cooking module 100.

The ingredient discharge unit 120, which is a component located inside the first frame part 110, serves to store ingredients supplied by the user and discharge the stored ingredients or cooked ingredients in a direction in which the container is located.

The ingredient discharge unit may include a storage part 121 and a discharge part 122 to perform the above role.

The storage part 121 is a component that provides a space where user-supplied ingredients can be stored inside the cooking module 100.

A top of the storage part 121 is designed to be open or closed so as to allow the user to easily put ingredients into the storage part 121.

At least one surface of the storage part 121 may include an inclined surface such that, when a user supplies an ingredient to an upper end side of the storage part 121, the ingredient naturally rolls down to a lower end of the storage part due to the inclined surface so as to allow the ingredient to be neatly stacked from the lower end of the storage part 121.

An angle of inclination of the inclined surface of the storage part 121 may vary depending on a size and shape of the cooking module 100, and the inclined surface of the storage part 121 may be treated with a non-slip material such that ingredients can roll down and be loaded efficiently, and furthermore, a surface of the inclined surface may be provided with a texture or a shape of the inclined surface may exhibit a bead and rib pattern.

For reference, the bead mentioned herein, which is a pattern made up of a series of small round shapes, may be mainly textured materials such as rubber, plastic, and cement that are arranged on a surface in a specific pattern to prevent slipping or to be utilized when moving a load, and the rib, which is a shape used to reinforce or distinguish a specific area, may refer to a pattern that protrudes on a flat surface.

Additionally, a volume detection sensor (not shown) may be provided inside the storage part 121 to check a remaining amount of the ingredient thereinside. The volume detection sensor may serve to detect and measure a volume of ingredients inside the storage part 121, and when the detected data value (volume value) is below a preset appropriate remaining amount, a notification message may be sent to the user indicating that the ingredients need to be supplied.

The volume detection sensor may detect a volume inside the storage part 121 by utilizing volume detection technology such as laser, ultrasound, and infrared, and when an ingredient is supplied into the storage part 121, the volume detection sensor detects the ingredient and measures an actual volume inside the storage part 121, and determines whether the supplied ingredient volume value is above the preset appropriate remaining amount so as to also confirm whether the user has supplied the ingredient appropriately. Additionally, the volume detection sensor allows the user to check an amount of ingredient remaining in the storage part in real time at any time through the volume detection sensor.

The storage part 121 not only serves to simply store ingredients, but also serves to transfer the stored ingredients to the discharge part 122 to be described later, and a principle and concept of the storage part 121 transferring ingredients to the discharge part 122 will be described in more detail when describing with reference to FIG. 3 below.

Figure 3:
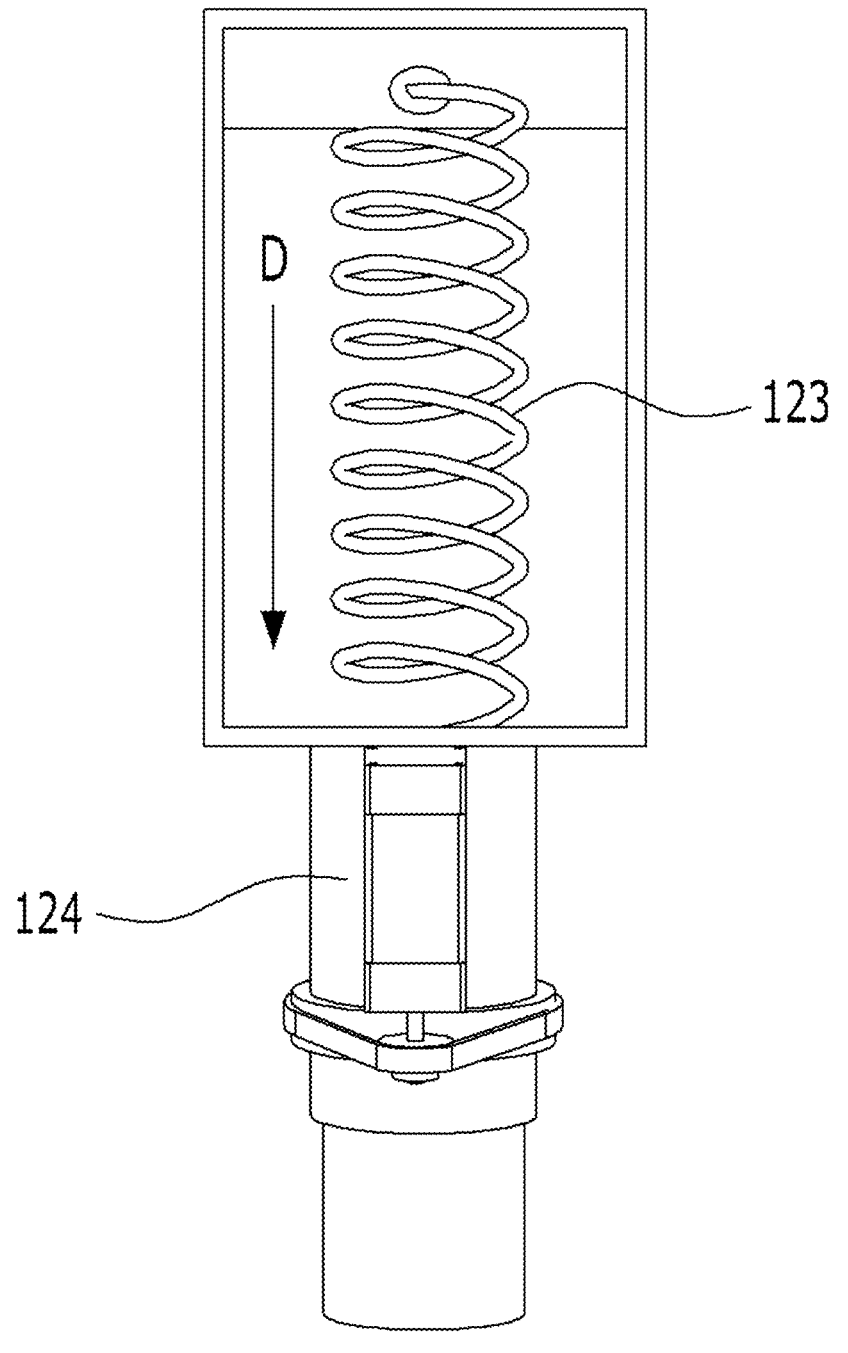
FIG. 3 is a view showing an internal configuration of a storage part of an ingredient discharge part in the modular automated cooking apparatus according to the first embodiment of the present disclosure.

FIG. 3 is a view showing an internal configuration of the storage part 121 of the ingredient discharge unit 120 according to the first embodiment of the present disclosure.

Referring to FIG. 3, the ingredient discharge unit 120 may include a spiral-shaped shaft part 123 located inside the storage part 121 and a motor part 124 that provides power to the shaft part 123.

When the motor part 124 supplies power to the shaft part 123, the shaft part 123 rotates to push the ingredient stored in the storage part 121 in a direction D where the discharge part 120 is located so as to allow the discharge part 122 to discharge the ingredient stored in the storage part 121.

A rotation speed or number of rotations per second of the shaft part 123 may vary depending on the ingredient stored in the storage part 121. For example, since an ingredient such as lettuces can be damaged (e.g., cut) by a rapid rotation of the shaft part 123, the rotation speed of the shaft 123 in which the lettuces are stored in the storage part 121 may be set slower than that of other ingredients, and since an ingredient with a small cross-sectional area such as peanuts or olives can only circulate inside the storage part 121 if the rotation speed is slow or the number of rotations per second is low, the rotation speed of the shaft part 123 in which ingredients with a small cross-sectional area such as peanuts or olives are stored may be set to be fast and the number of rotations per second may be set high.

Returning to the description of FIG. 2, the description of the discharge part 122 and the first container moving part 130, which are elements of the cooking module 100, will be continued.

The discharge part 122, which is a component disposed on one surface of the storage part 121, may discharge an ingredient stored in the storage part 121 to the outside in a manner in which a discharge port is selectively opened or closed.

The manner in which the discharge port is opened or closed may utilize a manner in which a cap-shaped member covers or opens an entire surface of the discharge port, but is not limited thereto, and any discharge port opening/closing manner within the technical field of the present disclosure may be a discharge port opening or closing manner of the present disclosure.

An area of the discharge port may vary depending on the ingredient stored in the storage part 121, and the material of the discharge part 122 may be made of stainless steel, which is excellent in hygiene and cleanliness, as it is a component that comes into contact with the ingredient and moves, and the material of the discharge port may be made of a plastic material that is durable enough to prevent the ingredient from being damaged during the process of discharging, but can also prevent damage and deterioration of the ingredient when coming into contact with the ingredient.

In addition, an angle and position of the discharge part 122 may be adjusted according to the characteristics of the ingredient, and such adjustment may be executed based on the user's arbitrary operation or learned data. For example, spherical ingredients such as cherry tomatoes may naturally roll out of the discharge port without the user having to arbitrarily adjust the angle of the discharge part 122, but relatively light and bulky ingredients such as lettuces and salad may be discharged out of the discharge port only when the angle of the discharge part 122 is arbitrarily adjusted, and accordingly, the ingredient discharge unit 120 may determine what ingredients are inside the storage part 121, calculate the angle and position of the discharge part 122 at which the determined ingredients can be easily discharged based on the characteristics of the determined ingredients (e.g., shape, volume, weight, etc.), and allow the discharge part 122 to be adjusted to the calculated angle and position of the discharge part 122.

The ingredient discharge unit 120 including the aforementioned elements may be arranged in N (N is a positive integer) units within one cooking module 100, and N ingredient discharge units 122 may respectively store different ingredients (e.g., lettuces, tomatoes, olives, etc.).

Meanwhile, the cooking module 100 performs an operation of cooking or putting stored ingredients into a container, and in order to perform the operation without user intervention, a container must be supplied from the container supply module 200 before and after the cooking operation, and if the ingredients are discharged into the container, the ingredients must be transferred to the lifting module 300 to be described later, and therefore, the cooking module 100 may include a first container moving part 130 that receives the container from the container supply module 200 and transfers the finished product to the lifting module 300.

The first container moving part 130 may include a first conveyor belt 131 and a weight detection sensor 132 to receive a container from the container supply module 200 and transfer the finished product to the lifting module 300.

The first conveyor belt 131 is located in front of each of N or more ingredient discharge units 120 and is configured with N units corresponding to the ingredient discharge units 120, and serves to move the container toward the ingredient discharge unit 120 in the following sequence.

The weight detection sensor 132 is located on each of N or more first conveyor belts 131 to serve to detect a weight of the container located on the first conveyor belt 131.

The weight detection sensor 132 detects a weight of the container and the ingredients contained in the container, and in the present disclosure, the weight detected by the weight detection sensor 132 may be utilized as a data resource for determining whether the container has contained a predetermined amount of ingredients, or utilized as a data resource for determining whether to move to the ingredient discharge unit 120 in the following sequence, which includes ingredients other than the previously contained ingredients.

In addition, the first conveyor belt 131 may include a position detection part (not shown) and a position adjustment driving part (not shown) that can finely adjust the position of the container so as to allow the ingredient discharged by the discharge part to be accurately and precisely contained in the container.

The position detection part may serve to detect an area in which a current container touches within a surface area of the first conveyor belt 131 so as to check a current position of the container within the first conveyor belt 131.

In addition, the position detection part may detect the angle or position of the discharge part 122 to calculate an optimal position for the container to accurately and precisely contain the ingredient discharged by the discharge part, and the calculated optimal position may be transmitted to the position adjustment driving part.

The adjustment driving part receives an optimal position calculated by the position detection part for the container to accurately and precisely contain the ingredient discharged by the discharge part, and serves to automatically adjust the position of the container so as to allow the container to reach the optimal position.

The first container moving part 130 operates the first conveyor belt 131 based on the weight detected by the weight detection sensor 132 and moves the container through the operated first conveyor belt 131, and an operation principle and concept of the first container moving part 130 will be described in more detail with reference to FIG. 4.

Figure 4:
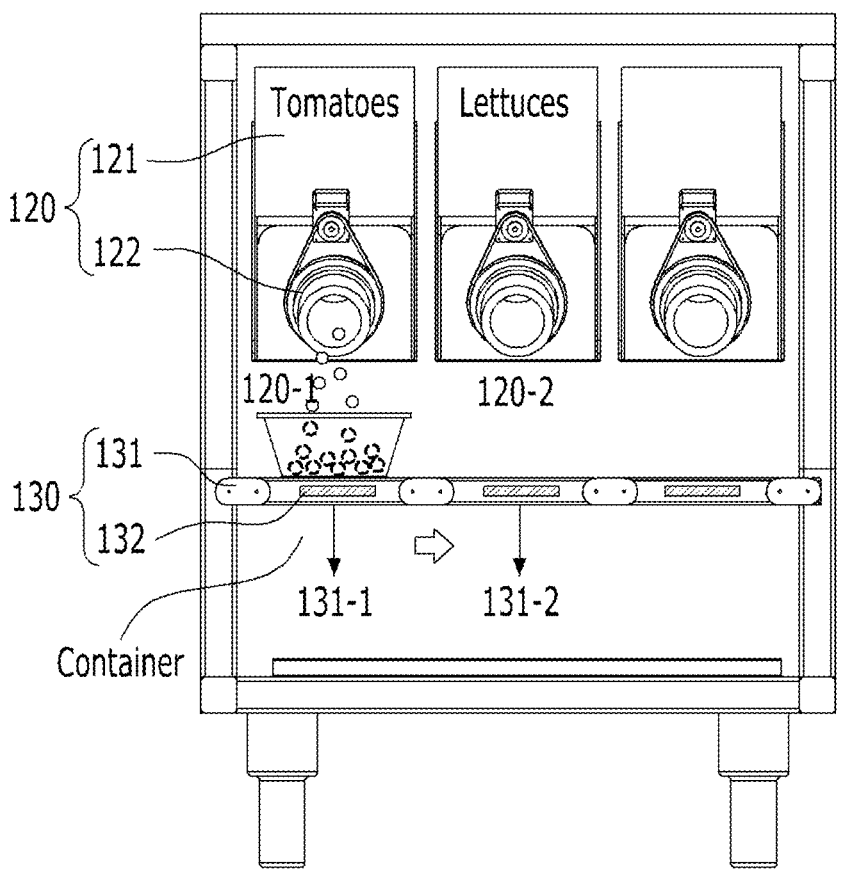
FIG. 4 is a view showing for explaining an operation principle and concept of a first container moving part in the modular automated cooking apparatus according to the first embodiment of the present disclosure.

FIG. 4 is a view showing for explaining an operation principle and concept of the first container moving part 130 according to the first embodiment of the present disclosure, and FIG. 4 is a view showing a configuration in which the cooking module 100 cooks a specific finished product using 50 g of lettuces and 50 g of tomatoes as ingredients.

In order to explain an example in which the cooking module 100 cooks the specific finished product through FIG. 4, it is assumed that N ingredient discharge units 120 are arranged in the cooking module 100 of FIG. 4, tomatoes are stored in the storage part 121 of the first ingredient discharge unit 120-1, lettuces are stored in the storage part 121 of the second ingredient discharge unit 120-2, and a container is disposed on a first-first container belt 131-1 located in front of the first ingredient discharge unit 120-1.

Referring to FIG. 4, the cooking module 100 allows the first ingredient discharge unit 120-1 to discharge tomatoes stored in the storage part 121 through the discharge part 122 in order to cook a finished product, but when the weight detection sensor 132 detects a weight that is a sum of the weight (50 g) of the predetermined amount of tomatoes and the weight (a) of the bowl, the cooking module 100 determines that the predetermined amount of tomatoes has been loaded into the container by the first ingredient discharge unit 120-1 to stop a discharge operation of the first ingredient discharge unit 120-1, and controls an operation of the first-first conveyor belt 131-1 so as to allow the container to move to the first-second conveyor belt 131-2 located in front of the second ingredient discharge unit 120-2 in the following sequence in which the next ingredient lettuces are discharged.

Then, the second ingredient discharge unit 120-2 discharges lettuces into the container located on the first-second conveyor belt 131-2, but when the weight detection sensor 132 detects a weight that is a sum of the predetermined amount of lettuces (50 g), the predetermined amount of tomatoes 50, and the weight (a) of the bowl, the cooking module 100 determines that the predetermined amount of tomatoes has been loaded into the container by the second ingredient discharge unit 120-2 to stop a discharge operation of the second ingredient discharge unit 120-2, and controls an operation of the first-second conveyor belt 131-2 so as to allow the container to move to the conveyor belt 131 located in front of the ingredient discharge unit 120 in the following sequence in which the next ingredient is discharged.

In the above, an overall configuration and operation principle of the cooking module 100 according to the first embodiment of the present disclosure has been examined in detail.

Figure 5:
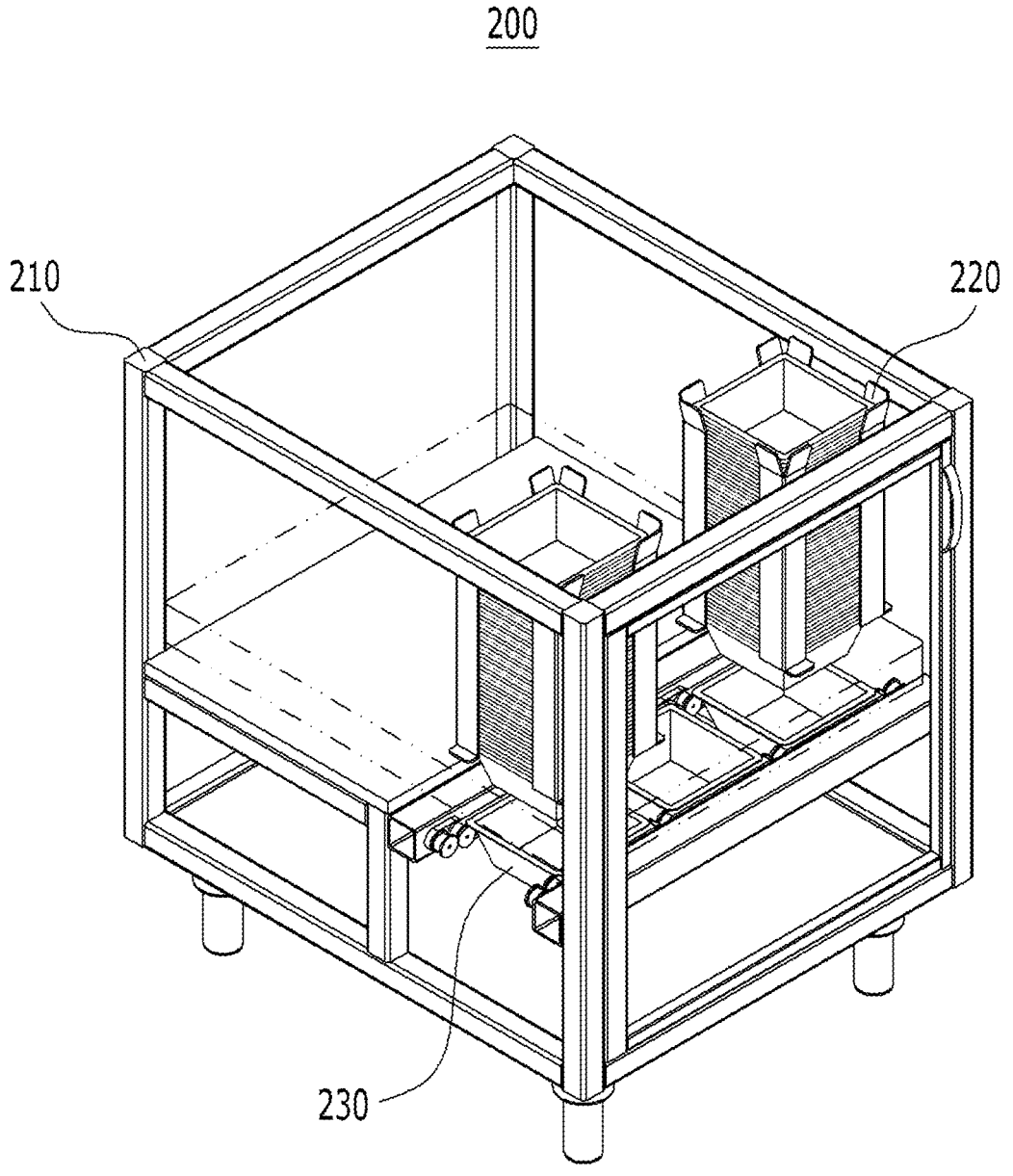
FIG. 5 is a perspective view showing an entire configuration of a container supply module in the modular automated cooking apparatus according to the first embodiment of the present disclosure.
Figure 6:
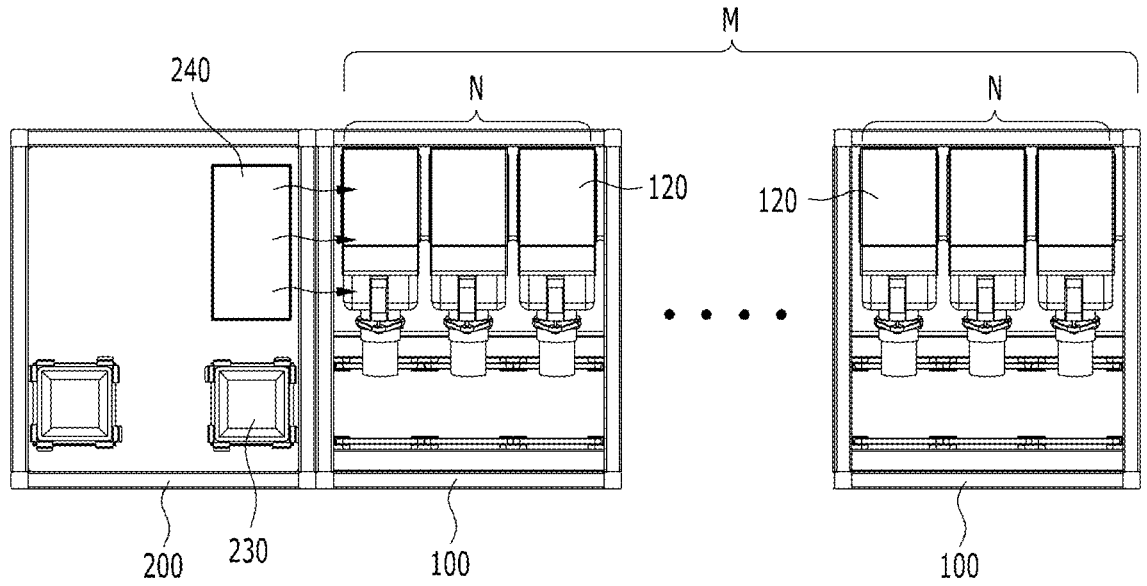
FIG. 6 is a view showing an ingredient refrigeration part of a container supply module in the modular automated cooking apparatus according to the first embodiment of the present disclosure.
Figure 7:
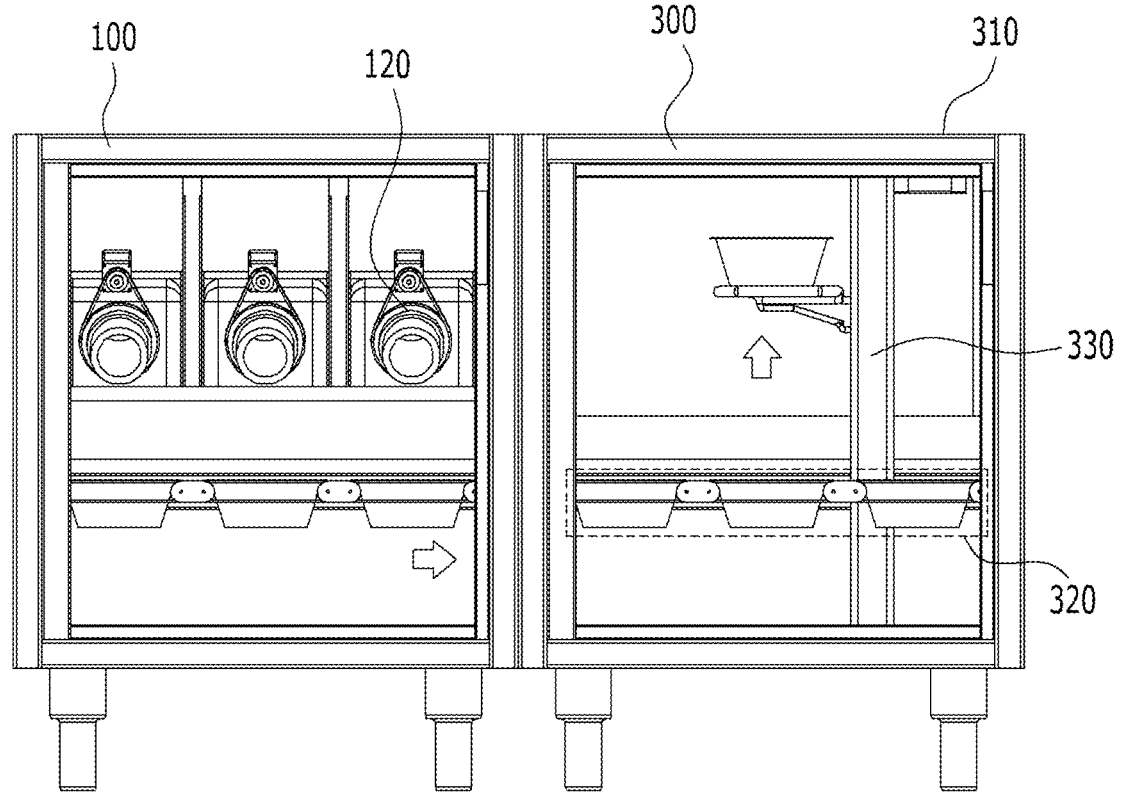
FIG. 7 is a view showing a configuration in which a lifting module receives a container from a cooking module and lifts it to the outside in the modular automated cooking apparatus according to the first embodiment of the present disclosure.

Next, an overall configuration of the container supply module 200 and the lifting module 300 according to the first embodiment of the present disclosure will be examined with reference to FIGS. 5 to 7.

FIG. 5 is a perspective view showing an overall configuration of the container supply module 200 according to the first embodiment of the present disclosure.

Referring to FIG. 5, the container supply module 200 may include a second frame part 210, a container loading part 220, and a second container moving part 230.

The second frame part 210, which is a component connected or coupled to the first frame part of the cooking module 100, may allow the automated cooking apparatus of the present disclosure to be utilized in a 'modular' manner.

The second frame part 210 may have the same shape, material, and size as the first frame part 210, but since the container supply module 200 does not contain ingredients that need to be maintained fresh, unlike the cooking module 100, it may not have a shape, material, or size for maintaining freshness. For example, even if the first frame part 210 of the cooking module 100 is made of a heat retaining material or heat insulating material, the container supply module 200 may be made of another material other than a heat retaining material or heat insulating material since there is no temperature-sensitive ingredient or component closely related to temperature thereinside.

The container loading part 220, which is a component located inside the second frame part 210, is an element in which containers are loaded, as the term suggests.

The container loading part 220 may discharge containers corresponding to a number of orders or a number of containers required for cooking.

The second container moving part 230, which is a component including at least one second conveyor belt located in front of the container loading part 220, serves to move containers discharged by the container loading part 220.

The container supply module 200 including those components may discharge a container loaded inside the container loading part 220 toward the second conveyor belt when cooking starts, and drive the second conveyor belt so as to allow the container move to the first conveyor belt 131 of the cooking module 100 adjacent to the container supply module 200, thereby allowing the container to be supplied to the cooking module 100 without user intervention.

Meanwhile, as described above, since the cooking module 100 stores ingredients, the material of the first frame 110 may be made of a heat retaining material that maintains temperature and a heat insulating material that blocks heat in order to maintain the freshness of the stored ingredients.

However, since the material of the first frame 110 made of a heat retaining material that maintains temperature and a heat insulating material that blocks heat only slows down the speed at which the temperature deviates from an optimal temperature for maintaining the freshness of the ingredients, but does not maintain the optimal temperature for maintaining the freshness of the ingredients, and therefore, the container supply module 200 includes an ingredient refrigeration part 240 that can maintain the optimal temperature for maintaining the freshness of the ingredients, and the ingredient refrigeration part 240 will be described below with reference to FIG. 6.

FIG. 6 is a view showing the ingredient refrigeration part 240 of the container supply module 200 according to the first embodiment of the present disclosure.

Referring to FIG. 6, the ingredient refrigeration part 240 may be located inside the container supply module 200, and may include a cold air ejection part (not shown) that ejects cold air to maintain the temperature of the ingredient stored in the storage part 121 below a predetermined level.

The ingredient refrigeration part 240 may be disposed such that the cold air ejection part faces a direction in which the ingredient discharge unit 120 is disposed in the cooking module 100, so as to allow, when cold air is ejected, the cold air to easily reach the ingredient discharge unit 120.

A temperature of the cold air ejected from the cold air ejection part and a frequency of ejecting the cold air may be arbitrarily controlled by the user, and the user may customize the temperature of the cold air or the frequency of ejecting the cold air according to the optimal temperature for maintaining the freshness of each food product.

Hereinafter, the lifting module 300 according to the first embodiment of the present disclosure will be described with reference to FIG. 7.

A direct cooking operation of the method and apparatus 10 for automatically cooking user-customized food according to the first embodiment of the present disclosure may be performed inside the first frame 110 of the cooking module 100 to prevent contact with a user (e.g., store operator, customer) and infiltration of external unsanitary factors (e.g., dust, bacteria).

Therefore, in order to transfer a finished product completed by the cooking module 100 to the user, a module that serves to transfer the finished product located inside the first frame 110 of the cooking module 100 to the outside will be required, and the module that can perform the role is the lifting module 300 according to the first embodiment of the present disclosure.

FIG. 7 is a view showing a configuration in which the lifting module 300 according to the first embodiment of the present disclosure receives a container from the cooking module 100 and lifts it to the outside.

Referring to FIG. 7, the lifting module 300 may include a third frame part 310, a third container moving part 320, and a lifting part 330.

The third frame part 310, which is a component designed to be connected to the first frame part 110 of the cooking module 100, may allow the automated cooking apparatus of the present disclosure to be utilized in a 'modular' manner similar to the second frame part 210. In other words, the method and apparatus 10 for automatically cooking user-customized food according to the first embodiment of the present disclosure may be provided such that the first to third frame parts 110, 210, 310 of the cooking module 100, the container supply module 200, and the lifting module 300, respectively, are connected to one another so as to allow the user to arbitrarily change the number, arrangement order, and direction of the modules.

Figure 8:
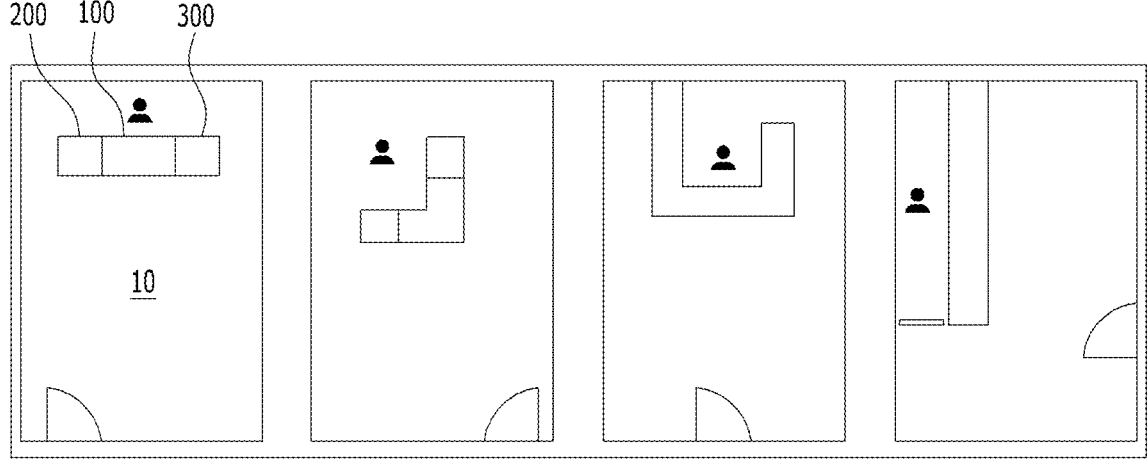
FIG. 8 is a view showing an example of freely arranged modules in the modular automated cooking apparatus according to the first embodiment of the present disclosure.

The technical features of connections or couplings between the first to third frame parts 110, 210, 310 may allow the user to autonomously adjust an arrangement of the method and apparatus 10 for automatically cooking user-customized food according to the user's marketing and taste without restrictions on the installation space. For example, as shown in FIG. 8, the user may freely connect the first to third frame parts 110, 210, 310 provided in the cooking module 100, the container supply module 200, and the lifting part 300, respectively, so as to allow the method and apparatus 10 for automatically cooking user-customized food to be arranged in a horizontal ( — ) shape, vertical (I) shape, 'L' shape, or ' Π ' shape according to the user's store space, marketing, and taste.

The third container moving unit 320 may be located inside the third frame part 310, and may include a third conveyor belt that receives a container that has passed through a last unit among N or more ingredient discharge units 120 included in the cooking module 100 from the first conveyor belt.

The lifting part 330 is a component that lifts the container received from the third conveyor belt to the outside of the third frame part 310.

The lifting part 330 is generally made of steel or reinforced metal material capable of stably lifting the container so as to be durable.

The lifting part 330 may utilize a hydraulic lifting method that lifts the container using a hydraulic cylinder to lift the container outside the third frame part 310, an air pressure lifting method that lifts the container using compressed air, or an electric lifting method that lifts the container using an electric motor or servo system.

In addition, the lifting part 330 may adjust the lifting speed differently depending on the finished product to be lifted. For example, a weight detection sensor may be provided in the lifting part 330, and when it is determined that the finished product to be lifted is heavy based on a weight acquired from the weight detection sensor, it may be determined that the container contains a lot of ingredients so as to allow the lifting speed to be relatively lowered to prevent the ingredients from falling out of the container.

The lifting module 300 including those components may determine a time point at which the container has been transferred to perform an operation to accurately transfer the container to an outside of the third frame unit. Specifically, a container arrival detection sensor may be provided on the third conveyor belt of the lifting part 330 to detect when a container that has passed through the last unit among the N or more ingredient discharge units 120 has reached the third conveyor belt so as to allow the third conveyor belt to transfer the container to the lifting part 330.

In the above, the method and apparatus 10 for automatically cooking user-customized food according to the first embodiment of the present disclosure has been examined.

Next, a method and apparatus 10' for automatically cooking user-customized food according to a second embodiment of the present disclosure will be described with reference to FIG. 9.

As described above, different ingredients may be stored in the M cooking modules 100, and the ingredient refrigeration part 240 according to the first embodiment of the present disclosure is provided in the container supply module 200 to maintain the freshness of those ingredients.

However, optimal temperatures required to maintain freshness of ingredients will be different for respective ingredients, and even if the optimal temperatures required to maintain freshness of all ingredients stored in the M cooking modules 100 are the same, the freshness of ingredients stored in the cooking module 100 adjacent to the ingredient refrigeration part 240 according to the first embodiment of the present disclosure will be different from that of ingredients not stored therein, and therefore, a method and apparatus 10' for automatically cooking user-customized food according to the second embodiment of the present disclosure includes an ingredient refrigeration part 240' arranged in each of the N cooking modules 100.

Figure 9:
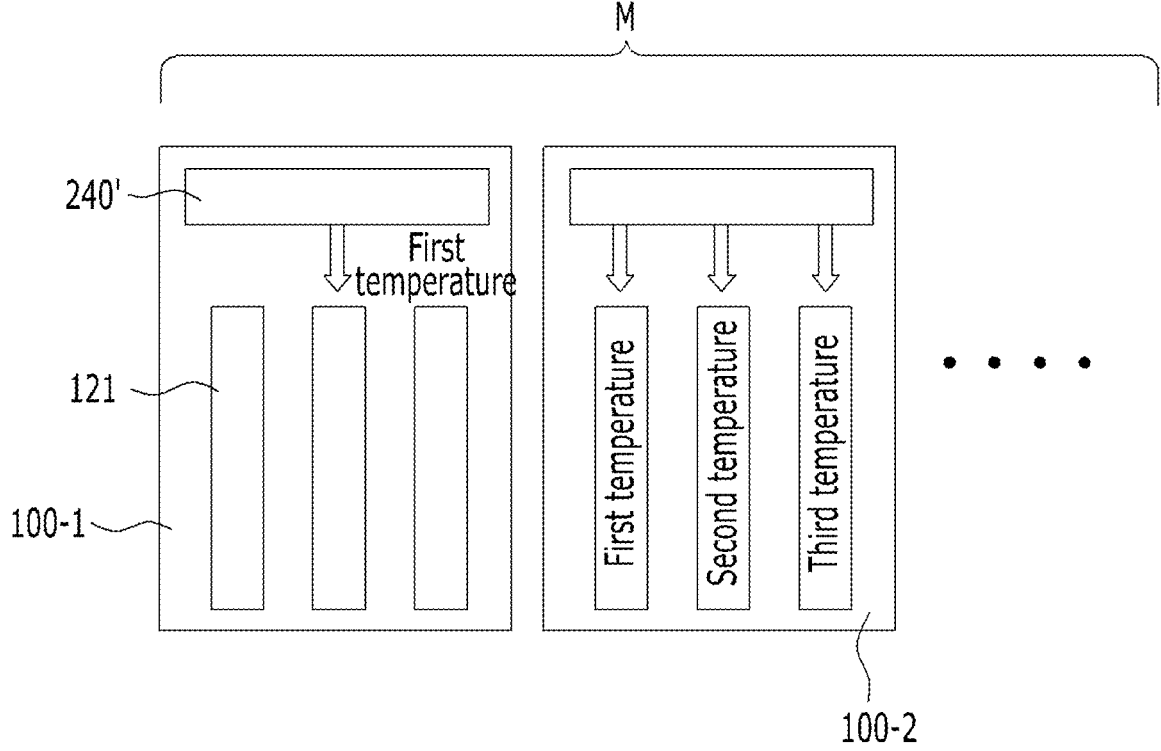
FIG. 9 is a view schematically showing a configuration of an ingredient refrigeration part in the modular automated cooking apparatus according to the first embodiment of the present disclosure.

FIG. 9 is a view schematically showing a configuration of the ingredient refrigeration part 240' in the modular automated cooking apparatus according to the first embodiment of the present disclosure.

Referring to FIG. 9, in the modular automated cooking apparatus according to the first embodiment of the present disclosure, the ingredient refrigeration part 240' may be disposed on a top of each of the M cooking modules 100.

The ingredient refrigeration part 240' may be disposed in each of the M cooking modules 100 to eject cold air to maintain the temperature of the ingredients stored inside the cooking modules 100 below a predetermined level.

For example, if the first cooking module 100-1 is provided with three ingredient discharge units 120 and the same food is stored in the three ingredient discharge units 120, the ingredient refrigeration part 240' may eject cold air at the same first temperature throughout the first cooking module 100-1 to maintain the temperature of the ingredient stored in each of the three ingredient discharge units 120 below a predetermined level.

However, the cooking module 100 may be provided with N ingredient discharge units 120 storing different ingredients, and optimal temperatures required for the ingredients stored in the N ingredient discharge units 120 to maintain freshness may be different, and therefore, the ingredient refrigeration parts 240' may be arranged in the M cooking modules 100, respectively, and may eject cold air at different temperatures to the N ingredient discharge units 120, respectively, provided in the cooking module 100.

For example, if the second cooking module 100-2 is provided with three ingredient discharge units 120 and different ingredients are stored in the three ingredient discharge units 120, the ingredient refrigeration parts 240' may eject cold air at a first temperature, a second temperature, and a third temperature to the three ingredient discharge units 120, respectively, so as to allow the ingredients stored in the three ingredient discharge units 120, respectively, to be customized to maintain optimal temperatures for maintaining freshness.

In the above, the description with reference to FIGS. 1 to 9 corresponds to a description in a hardware aspect of the modular automated cooking apparatus 10 according to the first embodiment of the present disclosure, and hereinafter, a description will begin in a software aspect of the modular automated cooking apparatus 10 according to the first embodiment of the present disclosure.

Figure 10:
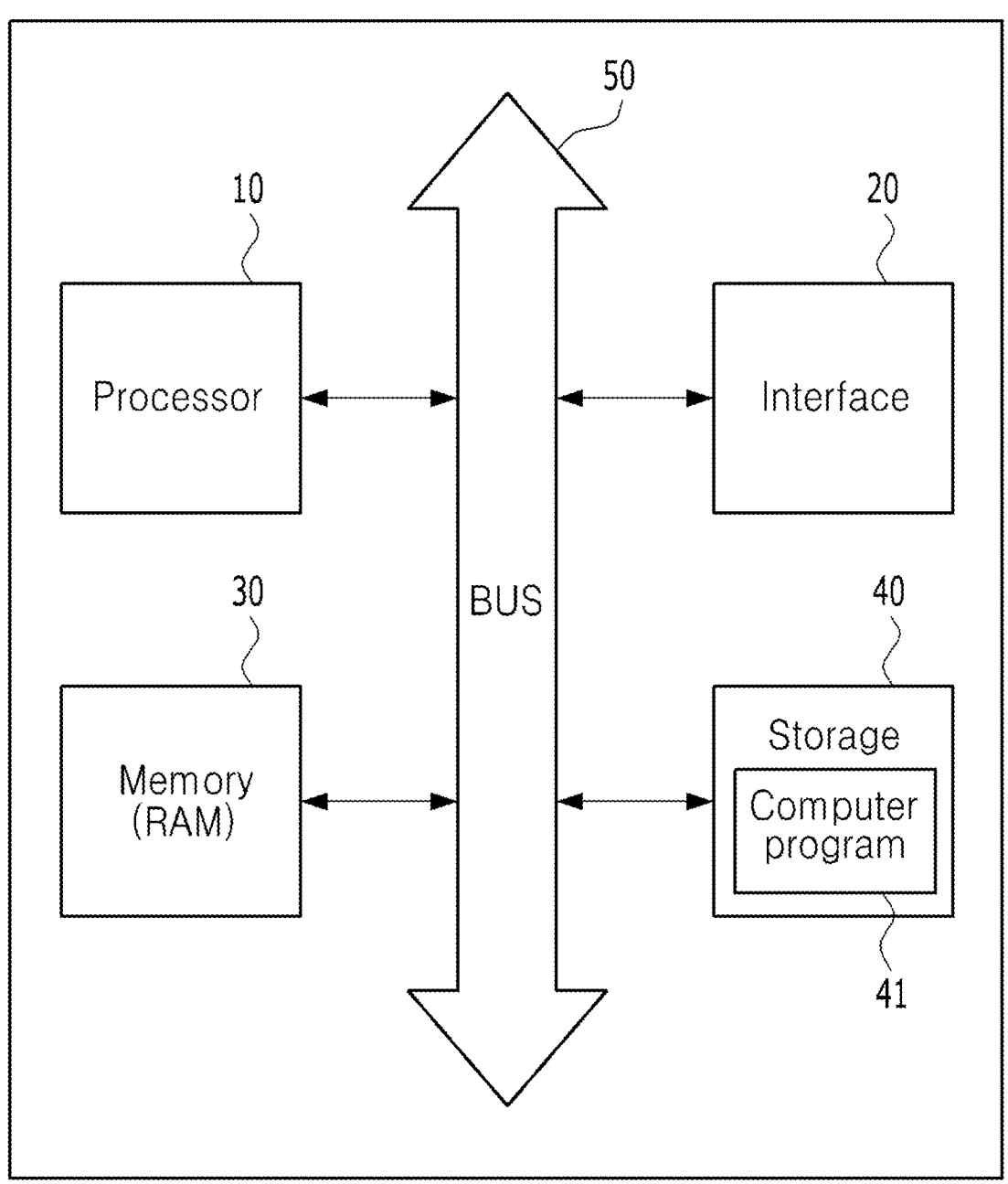
FIG. 10 is a view illustratively showing an overall configuration included in the modular automated cooking apparatus according to the first embodiment of the present disclosure from a software perspective.

FIG. 10 is a view illustratively showing an overall configuration included in the modular automated cooking apparatus 10 according to the first embodiment of the present disclosure from a software perspective.

However, this is only a preferred embodiment for achieving the objectives of the present disclosure, and some components may be added thereto or deleted therefrom as needed, and a function performed by any one component may, of course, be performed together with other components.

The modular automated cooking apparatus 10 according to the first embodiment of the present disclosure may include a processor 11, a network interface 12, a memory 13, a storage 14, and a data bus 17 connecting therebetween, and may, of course, further include additional components required to achieve the other objectives of the present disclosure.

The processor 11 controls an overall operation of each component. The processor 11 may be any one of a central processing unit (CPU), a microprocessor unit (MPU), a micro controller unit (MCU), or a type of artificial intelligence processor widely known in the art to which the present disclosure pertains. Moreover, the processor 11 may perform operations for at least one application or program for performing the method for automatically cooking user-customized food according to the second embodiment of the present disclosure, and to this end, the processor 11 may include an artificial intelligence model exhibiting a predetermined structure, which will be described later.

The network interface 12 may support wired and wireless Internet communication of the modular automated cooking apparatus 10 according to the first embodiment of the present disclosure, and may also support other known communication methods. Therefore, the network interface 12 may include a communication module according thereto.

The memory 13 may store various information, commands, and/or information, and load one or more computer programs 15 from the storage 14 in order to perform a method for automatically cooking user-customized food according to the second embodiment of the present disclosure. Although a RAM is shown as a type of the memory 13 in FIG. 10, various storage media may, of course, be used for the memory 13 in addition thereto.

The storage 14 may non-temporarily store one or more computer programs 15 and mass network information 16. The storage 14 may be any one of a non-volatile memory such as a read only memory (ROM), an erasable programmable ROM (EPROM), an electrically erasable programmable ROM (EEPROM), a flash memory, or the like, a hard disk drive (HDD), a solid state drive (SSD), a removable disk, and a type of computer-readable recording medium widely known in the art to which the present disclosure pertains.

The computer program 15 may be loaded into the memory 13 to generate and may be executed by one or more processors 11 in the following manner: (A) a first step of generating order information corresponding to order details input by a user, the order information including menu information, which is information generated about a menu that the user wishes to order; (B) a second step of transmitting a first control command to a first module among the N modules according to the generated order information, the first control command being a container discharge command; (C) a third step of respectively transmitting a second control command to an (N−1)th control command to one or more of a second module to an (N−1)th module among the N modules according to the menu information included in the generated order information; and (D) a fourth step of transmitting an N-th control command to an N-th module among the N modules according to the generated order information, the N-th control command being a container lifting command.

The operations performed by the computer program 15 briefly mentioned above may be regarded as one function of the computer program 15, and a more detailed description will be described later in the description of a method for automatically cooking user-customized food according to the second embodiment of the present disclosure.

The data bus 17 serves as a transfer path for commands and/or information among the processor 11, the network interface 12, the memory 13, and the storage 14 described above.

The modular automatic cooking apparatus 10 according to the first embodiment of the present disclosure, which has been briefly described above, may be in a form of an independent device, for example, in a form of an electronic device as shown in FIG. 1, and herein, the electronic device may be a device that is fixedly installed and used in one location, as well as a portable device that is easy to carry and move, and hereinafter, a method for automatically cooking user-customized food according to a second embodiment of the present disclosure will be described assuming that the modular automatic cooking apparatus 10 according to the first embodiment of the present disclosure is in a form shown in FIG. 1.

FIG. 11 is a flowchart showing representative steps of a method for automatically cooking user-customized food according to a second embodiment of the present disclosure.

However, this is only a preferred embodiment in achieving the objectives of the present disclosure, and some steps may be added thereto or deleted therefrom as needed, and any one step may be included in another step to be performed.

Meanwhile, since it is assumed that each step is performed through the modular automated cooking apparatus 10 according to the first embodiment of the present disclosure, and since it is assumed that the modular automated cooking apparatus 10 according to the first embodiment of the present disclosure is in a form of an "independent device," control software installed in the modular automated cooking apparatus 10 according to the first embodiment of the present disclosure will be regarded as having the same meaning as the modular automated cooking apparatus 10 according to the first embodiment of the present disclosure, and for convenience of explanation, both of them will be named "apparatus 10."

In addition, it is assumed that the apparatus 10 includes N modules (N is a natural number greater than or equal to 3), and it is disclosed in advance that a basic set of one cooking module 100, one container supply module 200, and one lifting module 300 is set as a minimum unit for automatically cooking user-customized food.

First, the apparatus 10 includes generating order information corresponding to order details input by a user, the order information including menu information, which is information generated about a menu that the user wishes to order (S1110), which is called a first step.

The apparatus 10 may output control software (including a function of receiving an order) installed therein to a display means (not shown) or receive an order from a user through a POS device/kiosk, or the like, which is linked to the apparatus 10, and when an order is received from the user, order information corresponding to the entered order details may be generated, wherein the user may be anyone, such as a restaurant owner when the restaurant owner receives an order requested by a customer, or a customer when the customer himself or herself places an order.

The generated order information includes menu information, which is information generated about the menu that the user wishes to order. For example, when there are preset menus A to D, and a user orders menus A and B, the menu information generated for the user may be menus A and B, and furthermore, may further include preset recipe information on each menu, and thus may further include a preset recipe for cooking menu A and a preset recipe for cooking menu B.

Meanwhile, depending on the type of restaurant industry, a user may be able to order his or her own customized menu rather than a preset menu, and in this case, the menu information generated by the apparatus 10 may include recipe information on one or more types of ingredients selected by the user himself or herself to cook the customized menu.

For example, when a store selling salads has ten types of vegetables, three types of meat, three types of fish, and ten types of dressing, the user may be able to select types of ingredients according to his or her own taste, and in this case, the selected types of ingredients may be recipe information on the salad menu ordered the user.

Such order information may further include not only a menu (salad) that the user wishes to order, menu information (recipe) on the menu, but also other information (whether member/non-member, orderer number, whether to take out the food, etc.) on the user who placed the order, information on payment (payment location, payment amount, payment date and time, payment method, etc.), and information on the seller (business name, address, representative, business registration number, etc.), and in this case, the apparatus 10 may not only automatically cook food, but also perform an entire process from ordering ingredients to settlement for operating a restaurant business, thereby providing greater assistance in the operation of the restaurant owner.

If order information is generated, the apparatus 10 includes transmitting a first control command to a first module among the N modules according to the generated order information, the first control command being a container discharge command (S1120), which is called a second step.

Once the order information is generated, the apparatus 10 initiates actual steps for cooking the food, and a step corresponding to the initiation is a second step. More specifically, the second step is to transmit a first control command, which is a container discharge command, to the first module, wherein the first module may be the container supply module 200.

Meanwhile, the container discharge command may further include information on how many containers to discharge when the user has ordered a plurality of menus based on the generated order information, information on how long to wait for a next container to be discharged after discharging one container, and information on which container to discharge depending on whether it is take-out.

The container supply module 200, which is a first module that receives the first control command, discharges the container to a second ingredient moving part 130, and a description thereof will be replaced with the description of the modular cooking automation apparatus 10 according to the first embodiment of the present disclosure.

If the first control command is transmitted to the first module, the container may be discharged, and then the apparatus 10 includes respectively transmitting a second control command to an (N−1)th control command to one or more of a second module to an (N−1)th module among the N modules according to the menu information included in the generated order information (S1130), which is called a third step.

As mentioned above, the first module is the container supply module 200, and the modules connected thereafter are generally the cooking modules 100, and accordingly, the second module to the (N−1)th module may be the cooking modules 100. However, not all the modules may be the cooking modules 100, wherein in a case where the cooking modules 100 are arranged in one of left, right, and opposite directions in the middle, rather than in a straight line, a direction change module (not shown) must be installed for this purpose depending on a space where the modular automated cooking apparatus 10 according to the first embodiment of the present disclosure is installed, but for convenience of explanation, a case where the modular automated cooking apparatus 10 according to the first embodiment of the present disclosure is installed in a straight line as shown in FIG. 1, that is, a case where it is does not include the direction change module (not shown), will be described as an example.

Meanwhile, since the second module to the (N−1)th module may be the cooking modules 100, those modules may each include M (M is a natural number greater than or equal to 2) ingredient discharge units 120 that store ingredients and discharge the ingredients into a container, and in this case, each of the second control command to the (N−1)th control command may include one or more ingredient discharge commands that drive one or more of the M ingredient discharge units 120 included in the module receiving each control command to discharge the ingredients into the container.

More specifically, the ingredient discharge command may be transmitted to one or more ingredient discharge units 120 among the M ingredient discharge units 120 included in each of the second module to the (N−1)th module according to menu information, and may not be transmitted to the remaining ingredient discharge units 120, which will be described below with an example.

Assuming that the apparatus 10 includes the second module to the fifth module, that is, four cooking modules 100, as shown in FIG. 1, and each cooking module 100 includes three ingredient discharge units 120, each of the four cooking modules 100 includes three ingredient discharge units 120, and thus a total of twelve ingredient discharge units 120 are included, and are named in order from the left as a first ingredient discharge unit 120-1 to a twelfth ingredient discharge unit 120-12.

In addition, when the second cooking module 100 is in charge of vegetables, the third cooking module 100 is in charge of meat, the fourth cooking module is in charge of fish, and the fifth cooking module is in charge of dressing, and more specifically, the first ingredient discharge unit 120-1 is in charge of cabbages, the second ingredient discharge unit 120-2 is in charge of tomatoes, the third ingredient discharge unit 120-3 is in charge of cucumbers, the fourth ingredient discharge unit 120-4 is in charge of cubed beef, the fifth ingredient discharge unit 120-5 is in charge of chicken breast, the sixth ingredient discharge unit 120-6 is in charge of pork shoulder, the seventh ingredient discharge unit 120-7 is in charge of grilled sea bream, the eighth ingredient discharge unit 120-8 is in charge of raw salmon, the ninth ingredient discharge unit 120-9 is in charge of grilled salmon, and the tenth ingredient discharge unit 120-10 is in charge of oriental dressing, the eleventh ingredient discharge unit 120-11 is in charge of lemon dressing, and the twelfth ingredient discharge unit 120-12 is in charge of sesame dressing, and when the generated menu information is cabbages/tomatoes/cubed beef/raw salmon/ oriental dressing, the apparatus 10 will transmit a second control command to the second cooking module 100, a third control command to the third cooking module 100, a fourth control command to the fourth cooking module 100, and a fifth control command to the fifth cooking module 100, the second control command will include ingredient discharge commands for the first ingredient discharge unit 120-1 in charge of cabbages and the second ingredient discharge unit 120-2 in charge of tomatoes, but will not include an ingredient discharge command for the third ingredient discharge unit 120-3, the third control command will include an ingredient discharge command for the fourth ingredient discharge unit 120-4 in charge of cubed beef, but will not include ingredient discharge commands for the fifth ingredient discharge unit 120-5 and the sixth ingredient discharge unit 120-6, the fourth control command will include an ingredient discharge command for the eighth ingredient discharge unit 120-8 in charge of raw salmon, but will not include ingredient discharge commands for the seventh ingredient discharge unit 120-7 and the ninth ingredient discharge unit 120-9, and the fifth control command will include an ingredient discharge command for the tenth ingredient discharge unit 120-10 in charge of oriental dressing, but will not include ingredient discharge commands for the eleventh ingredient discharge unit 120-11 and the twelfth ingredient discharge unit 120-12.

Meanwhile, the apparatus 10 may not transmit a control command for a specific cooking module 100 as well as a specific ingredient discharge unit 120, and when the generated menu information is cabbages/tomatoes/raw salmon/ oriental dressing, a third control command for the third cooking module 100 in charge of meat may not need to be transmitted, and therefore, control commands to be transmitted are a second control command to an (N−1)th control command, respectively.

In this manner, the method for automatically cooking user-customized food according to the second embodiment of the present disclosure may automatically cook user-customized food by individually generating and transmitting control commands for the cooking modules 100 in charge of ingredients required to cook the menu, in any case, whether the menu the user wishes to order is a preset menu or a customized menu, and more specifically, ingredient discharge commands for the ingredient discharge units 120 in charge of the required ingredients among the M ingredient discharge units 120 included in the cooking modules 100.

Meanwhile, the second control command to the (N−1)th control command transmitted by the apparatus 100 to the second module to the (N−1)th module, respectively, and the first control command transmitted to the first module may include a conveyor belt control command for driving a conveyor belt included in the module receiving each control command to move a container a predetermined distance in a direction of an adjacent module.

Here, the conveyor belt may include an ingredient moving part, which has a concept that includes all components for moving a container, and the predetermined distance may be a distance from a current position of the container to a nearest ingredient discharge unit 120 that has received an ingredient discharge command in a direction of a neighboring module.

Describing this based on the previously mentioned menu information of cabbages/tomatoes/cubed beef/raw salmon/ oriental dressing, the apparatus 10 first transmits a first control command including a container discharge command to the first module, and accordingly, the first module discharges the container on a conveyor belt, and since the first control command includes a conveyor belt control command, the discharged container is moved to the first ingredient discharge unit 120-1 in charge of cabbages, which is a closest ingredient discharge unit 120 that has received the ingredient discharge command in a direction of a neighboring module. Then, the first ingredient discharge unit 120-1 discharges cabbages into the container according to a second control command including an ingredient discharge command, and when a preset weight is discharged, since the second control command includes a conveyor belt control command, the container is moved to the second ingredient discharge unit 120-2 in charge of tomatoes, which is a closest ingredient discharge unit 120 that has received the ingredient discharge command in a direction of a neighboring module based on the first ingredient discharge unit 120-1. Then, the second ingredient discharge unit 120-2 discharges tomatoes into the container according to the second control command including an ingredient discharge command, and when a preset weight is discharged, since the second control command includes a conveyor belt control command, the container is moved to the fourth ingredient discharge unit 120-4 in charge of cubed beef, which is a closest ingredient discharge unit 120 that has received the ingredient discharge command in a direction of a neighboring module based on the second ingredient discharge unit 120-2. Then, the fourth ingredient discharge unit 120-4 discharges cubed beef into the container according to a third control command including an ingredient discharge command, and when a preset weight is discharged, since the third control command includes a conveyor belt control command, the container is moved to the eighth ingredient discharge unit 120-8 in charge of raw salmon, which is a closest ingredient discharge unit 120 that has received the ingredient discharge command in a direction of a neighboring module based on the fourth ingredient discharge unit 120-4. Then, the eighth ingredient discharge unit 120-8 discharges raw salmon into the container according to a fourth control command including an ingredient discharge command, and when a preset weight is discharged, since the fourth control command includes a conveyor belt control command, the container is moved to the tenth ingredient discharge unit 120-10 in charge of oriental dressing, which is a closest ingredient discharge unit 120 that has received the ingredient discharge command in a direction of a neighboring module based on the fourth ingredient discharge unit 120-4. Then, the container is moved to the tenth ingredient discharge unit 120-10, and the tenth ingredient discharge unit 120-10 discharge oriental dressing into the container according to the fifth control command including the ingredient discharge command, and if a preset weight is discharged, then the container must be moved to a nearest ingredient discharge unit 120 that has received the ingredient discharge command in a direction of a neighboring module based on the tenth ingredient discharge unit 120-10, but since the ingredient discharge for all of the cabbages/ tomatoes/cubed beef/raw salmon/oriental dressing has been completed, there is no ingredient discharge unit 120 to which the container is to be moved.

In this case, the container must be moved to the N-th module to be described later, and accordingly, among the second control command to the (N−1)th control command that the apparatus 10 transmits to the second module to the (N−1)th module, respectively, a control command including an ingredient discharge command transmitted to a last ingredient discharge unit 120 that receives an ingredient discharge command transmitted according to the menu information may include a conveyor belt control command for moving the container to the N-th module. In the previous example, the last ingredient discharge unit 120 that receives the ingredient discharge command is the tenth ingredient discharge unit 120-10 in charge of oriental dressing, and the ingredient discharge command transmitted to the tenth ingredient discharge unit 120-10 is included in the fifth control command, and thus the fifth control command includes a conveyor belt control command for moving the container to the N-th module if the ingredient is received from the tenth ingredient discharge unit 120-10 and a preset weight has been discharged. In this case, the container may be moved to the N-th module, which is a last module, by passing through the eleventh ingredient discharge unit 120-11 and the twelfth ingredient discharge unit 120-12.

If one of a second control command to an (N−1)th control command has been transmitted, the apparatus 10 includes transmitting an N-th control command to an N-th module among the N modules according to the lastly generated order information, the N-th control command being a container lifting command (S1140), which is called a fourth step.

Among the N modules, the N-th module may be a lifting module 300 because it is a last module, and accordingly, the N-th control command transmitted to the N-th module may be a lifting command to lift the container and provide it to the user, and a detailed description thereof will be replaced with the description of the modular cooking automation apparatus 10 according to the first embodiment of the present disclosure.

Up to the present, the method for automatically cooking user-customized food according to the second embodiment of the present disclosure has been described. According to the present disclosure, when simply receiving order details from a user, order information including recipe information may be generated, and control commands may be sent only to modules required to cook a menu ordered by the user according to the generated order information so as to automatically cook food, thereby having an advantage in that a restaurant business can be operated without hiring professional cooks with high labor costs. In addition, even if each module includes a plurality of ingredient discharge units 120, a control command received by the module may include an ingredient discharge command that is transmitted only to an ingredient discharge unit 120 that requires food discharge so as to prevent a situation in which an unintended ingredient is discharged, thereby effectively cooking user-customized food. Furthermore, a control command received by each module may include a conveyor belt control command for moving a container, the conveyor belt control command may be responsible for sequentially moving the container for the ingredient discharge units 120 that require ingredient discharge, a control command for a module including the ingredient discharge unit 120 that lastly discharges an ingredient may include a conveyor belt control command for automatically moving the container to a last module, and a control command for the last module may include a lifting command for providing the container with completed food to the user, thereby fully cooking a finished product without including any part of the cooking process by humans.

Meanwhile, the method for automatically cooking user-customized food according to the second embodiment of the present disclosure may further include periodically shaking ingredients stored in the ingredient discharge unit 120 so as to disperse them, setting how soon (how many seconds, how many minutes, etc.) to start cooking a next menu after the start of cooking a first menu when the generated order information includes a plurality of menus, discharging the ingredients into a container and setting how long to measure a preset weight to determine whether the weight is satisfied, setting a lifting height and speed when finally lifting the cooked food, and the like, which relate to functions mentioned in the modular automated cooking apparatus 10 according to the first embodiment of the present disclosure.

Finally, the modular automated cooking apparatus 10 according to the first embodiment of the present disclosure and the method for automatically cooking user-customized food according to the second embodiment of the present disclosure may also be implemented as a computer program stored in a computer-readable medium according to a third embodiment of the present disclosure, wherein in this case, the computer program may be combined with a computing apparatus to execute the following steps: (AA) a first step of generating order information corresponding to order details input by a user, the order information including menu information, which is information generated about a menu that the user wishes to order; (B B) a second step of transmitting a first control command to a first module among the N modules according to the generated order information, the first control command being a container discharge command; (CC) a third step of respectively transmitting a second control command to an (N−1)th control command to one or more of a second module to an (N−1)th module among the N modules according to the menu information included in the generated order information; and (DD) a fourth step of transmitting an N-th control command to an N-th module among the N modules according to the generated order information, the N-th control command being a container lifting command, and although not described in detail for the sake of redundant description, all technical features applied to the modular automated cooking apparatus 10 according to the first embodiment of the present disclosure and the method for automatically cooking user-customized food according to the second embodiment of the present disclosure may be, of course, applicable in the same manner to a computer program stored on a computer-readable medium according to the third embodiment of the present disclosure.

As described above, the embodiments of the present disclosure have been described with reference to the accompanying drawings, but it will be apparent to those skilled in the art to which the invention pertains that the invention can be embodied in other specific forms without departing from the concept and essential characteristics thereof. Therefore, it should be understood that the foregoing embodiments are merely illustrative but not restrictive in all aspects.

The invention claimed is:

1. A modular automation apparatus, the apparatus comprising M (M is a positive integer) or more cooking modules comprising:

a first frame part having a predetermined shape;

N (N is a positive integer) or more ingredient discharge units comprising a storage part located inside the first frame part to store an ingredient; and a discharge part disposed on one surface of the storage part to discharges the ingredient stored in the storage part in such a manner that a discharge port is selectively opened or closed; and a first container moving part comprising N or more first conveyor belts respectively located in front of the N or more ingredient discharge units so as to allow a container to move toward an ingredient discharge unit in a next sequence; and weight detection sensors located on the N or more first conveyor belts, respectively, so as to detect a weight of the container located on the first conveyor belt, wherein the first conveyor belt comprises:

a position detection part that detects an area with which the container currently comes into contact within a surface area of the first conveyor belt to check a position of the container, and detects an angle or position of the discharge part to calculate an optimal position where the container can accurately and precisely contain the ingredient discharged by the discharge part; and an adjustment driving part that receives the optimal position calculated by the position detection part to automatically adjust the position of the container so as to allow the container to reach the optimal position, wherein the storage part comprises an inclined surface that allows the ingredient to roll down to a lower end of the storage part so as to be neatly loaded from the lower end, the modular cooking automation device further comprising:

a container supply module comprising a second frame part to supply a container to the cooking module; and a lifting module comprising a third frame part to receive a container from the cooking module so as to lift it to the outside, and wherein the container supply module, the M cooking modules, and the lifting module can be arranged in any one of a horizontal ( — ) shape, a vertical (I) shape, an L-shape and a Π-shape according to a user's space by connecting the first frame part, the second frame part, and the third frame part.

2. The apparatus of claim 1, wherein the ingredient discharge unit further comprises:

a spiral-shaped shaft part located inside the storage part; and a motor part that provides power to the shaft part, and wherein when the motor part provides power to the shaft part, the shaft part rotates to push out the ingredient stored in the storage part in a direction where the discharge part is located.

3. The apparatus of claim 1, wherein the second frame part included in the container supply module can be connected to the first frame part of the cooking module, wherein the container supply module further comprises:

a container loading part located inside the second frame part, in which containers are loaded; and a second container moving part including at least one second conveyor belt located in front of the container loading part, and wherein when cooking starts, a container loaded inside the container loading part is dropped toward the second conveyor belt, and the second conveyor belt is driven to move the container to the first conveyor belt of the cooking module adjacent thereto.

4. The apparatus of claim 3, wherein the container supply module further comprises an ingredient refrigeration part comprising a cold air injection part that injects cold air to maintain a temperature of the ingredient stored in the storage part below a predetermined level, and wherein the ingredient refrigeration part is disposed such that the cold air ejection part faces a direction in which the ingredient discharge unit is disposed.

5. The apparatus of claim 1, wherein the third frame part included in the lifting module can be connected to the first frame part of the cooking module, and wherein the lifting module further comprises:

a third container moving part including a third conveyor belt that is located inside the third frame part to receive a container that has passed through a last unit among the N or more ingredient discharge units included in the cooking module from the first conveyor belt; and a lifting part that lifts the received container to an outside of the third frame part.

* * * * *